US006539158B2

(12) United States Patent
Kashihara et al.

(10) Patent No.: US 6,539,158 B2
(45) Date of Patent: Mar. 25, 2003

(54) OPTICAL WAVEGUIDE CIRCUIT

(75) Inventors: Kazuhisa Kashihara, Tokyo (JP); Kazutaka Nara, Tokyo (JP); Hiroyuki Koshi, Tokyo (JP); Takeshi Nakajima, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 86 days.

(21) Appl. No.: 09/778,814

(22) Filed: Feb. 8, 2001

(65) Prior Publication Data

US 2001/0046361 A1 Nov. 29, 2001

(30) Foreign Application Priority Data

Feb. 8, 2000 (JP) ........................................ 2000-030150

(51) Int. Cl.$^7$ ................................................ G02B 6/10
(52) U.S. Cl. ........................................ 385/129; 385/132
(58) Field of Search ................................. 385/132, 130, 385/131, 129, 14

(56) References Cited

U.S. PATENT DOCUMENTS 4,717,225 A * 1/1988 Feth et al. ..................... 385/11
5,799,118 A * 8/1998 Ogusu et al. .................. 385/14

OTHER PUBLICATIONS

S. Suzuki, et al., "Polarisation–Insensitive Arrayed –Waveguide Gratings Using Dopant–Rich Silica–Based Glass with Thermal Expansion Adjusted to Si Substrated," Electronic Letters, vol. 33, No. 13, Jun. 19, 1997, pp. 1173–1174.

S. Suzuki, et al., "Polarisation–Insensitive Arrayed –Waveguide Grating Multiplexer with SiO$_2$–on–SiO$_2$ Structure,"Electronic Letters, vol. 30, No. 8, Apr. 14, 1994, pp. 642–643.

* cited by examiner

Primary Examiner—Robert H. Kim
Assistant Examiner—Chih-Cheng Glen Kao
(74) Attorney, Agent, or Firm—Oblon, Spivak, McClelland, Maier & Neustadt, P.C.

(57) ABSTRACT

An optical waveguide circuit capable of controlling polarization crosstalk is provided. An under cladding is formed on a silicon substrate (11). A core is formed on the under cladding and has a waveguide structure in which one or more optical input waveguides (12) arranged side by side are connected at their exit ends with a first slab guide (13), which is connected at its exit end with an arrayed waveguide (14) composed of plural channel waveguides (14a) that are different in length with the difference preset, and the arrayed waveguide (14) is connected at its exit end with a second slab waveguide (15), which is connected at its exit end with a plurality of optical output waveguides (16). The top of the core is covered with an over cladding to form an optical waveguide portion (10) composed of the under and over claddings and the core. A plurality of light beams having different wavelengths are entered to the core in the multiplexed manner, and the entered light beams are outputted separately on the basis of the wavelength. The claddings and the core are formed from silica glass. The birefringence B in the optical waveguide portion (10) is set so as to satisfy $|B| \geq 1.2 \times 10^{-4}$ to reduce polarization crosstalk to −20 dB or less.

2 Claims, 4 Drawing Sheets

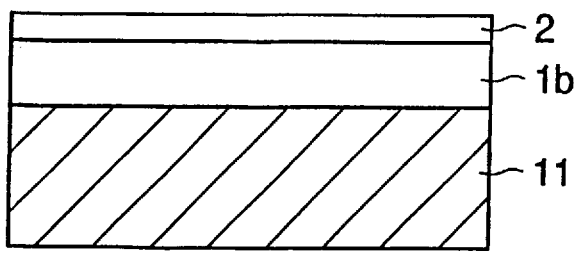
Fig. 4A
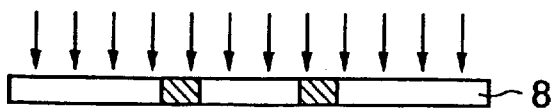
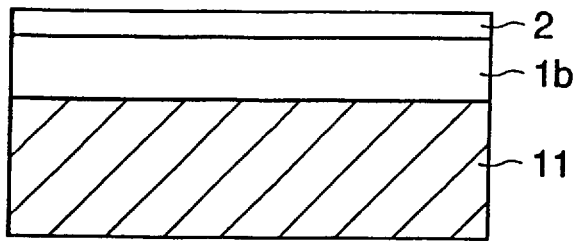
Fig. 4B
Fig. 4C
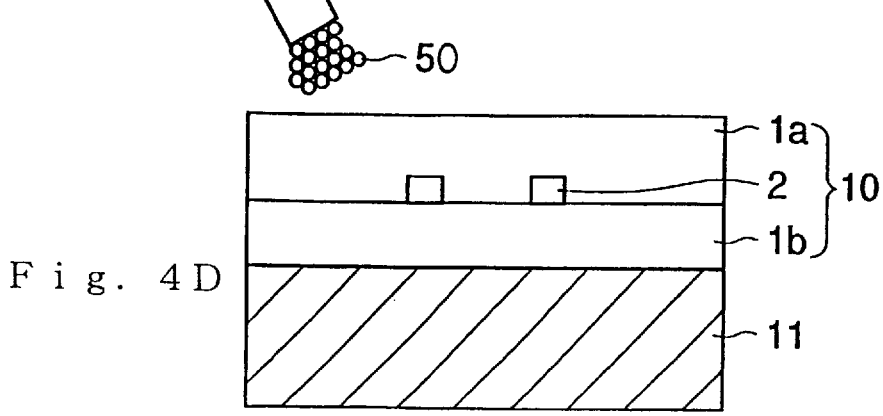
Fig. 4D

OPTICAL WAVEGUIDE CIRCUIT

BACKGROUND OF THE INVENTION

1. Field of the Invention

The present invention relates to an optical waveguide circuit such as an arrayed waveguide grating type optical multiplexer/demultiplexer used in optical communications or the like.

2. Description of the Related Art

In recent years, optical wavelength division multiplexing communications has been actively researched and developed in the hope of increasing exponentially data transmission capacity in optical communications, and it is beginning to be put into practice. Optical wavelength division multiplexing communications is to transmit data by putting, for example, a plurality of light beams having different wavelengths through wavelength division multiplexing. In such an optical wavelength division multiplexing communications system, the transmitted plural light beams with different wavelengths have to be picked separately on the basis of the wavelength by the receiver of the light beams. Therefore, a light transmissive element that transmits only a light beam having a predetermined wavelength, or like other elements, is indispensable for the system.

An example of the light transmissive element is an arrayed waveguide grating (AWG) shown in FIG. 1. The arrayed waveguide grating has, on a substrate 11 of silicon or the like, an optical waveguide forming region structure as shown in FIG. 1. The optical waveguide structure of the arrayed waveguide is composed of: one or more optical input waveguides 12 arranged side by side; a first slab waveguide 13 connected to the exit ends of the one or more optical input waveguides 12; an arrayed waveguide 14 composed of plural channel waveguides 14a arranged side by side connected to the exit end of the first slab waveguide; a second slab waveguide 15 connected to the exit end of the arrayed waveguide 14; and a plurality of optical output waveguide 16 arranged side by side and, connected to the exit end of the second slab waveguide. The arrayed waveguide 14 propagates light that is outputted from the first slab waveguide 13, and is composed of a plurality of channel waveguides 14a arranged side by side. Lengths of adjacent channel waveguides are different each other with the difference preset. The number of optical output waveguides 16 is determined, for example, in accordance with how many light beams having wavelengths different from one another are to be created as a result of demultiplexing or multiplexing of signal light by the arrayed waveguide grating. The channel waveguides constituting the arrayed waveguide are usually provided in a large number 100 for example. However, FIG. 1 is simplified and the number of the channel waveguides, the optical output waveguide 16, and the optical input waveguides 12 in FIG. 1 does not exactly reflect the actual number therof.

The optical input waveguides 12 are connected to, for example, transmission side optical fibers so that light having undergone the wavelength division maltiplexing is introduced to the optical input waveguides. The light having traveled through the optical input waveguide and been introduced to the first slab waveguide, is diffracted by the diffraction effect thereof, and enters the arrayed waveguide to travel along the arrayed waveguide.

Having traveled through the arrayed waveguide 14, the light reaches the second slab waveguide 15, and then is condensed in the optical output waveguides 16 to be outputted therefrom. Because of the preset difference between adjacent channel waveguides 14a of the arrayed waveguide 14, the light beams after traveling through the arrayed waveguide 14 have phases different from one another. The wavefront of the traveled light is tilted in accordance with this difference and the position where the light is condensed is determined by the angle of this tilt. Therefore, the light beams having different wavelengths are condensed at positions different from one another. By forming the optical output waveguides 16 at these positions, the light beams having different wavelengths can be outputted from their respective optical output waveguides 16 that are provided for the respective wavelengths.

For instance, as shown in FIG. 1, light beams having undergone the wavelength division multiplexing and having wavelengths of $\lambda 1, \lambda 2, \lambda 3 \ldots \lambda n$ (n is an integer equal to or larger than 2), respectively, are inputted to one of the optical input waveguides 12. The light beams are diffracted in the first slab waveguide 13, reach the arrayed waveguide 14, and travel through the arrayed waveguide 14 and the second slab waveguide 15. Then, as described above, the light beams are respectively condensed at different positions determined by their wavelengths, enter different optical output waveguides 16, travel along their respective optical output waveguides 16, and are outputted from the exit ends of the respective optical output waveguides 16. The light beams having different wavelengths are taken out through optical fibers for outputting light that are connected to the exit ends of the optical output waveguides 16.

In this arrayed waveguide grating, wavelength resolution of the grating is in proportion to the difference in length ($\Delta L$) among the adjacent channel waveguides 14a of the arrayed waveguide 14 that constitutes the grating. When the arrayed waveguide grating is designed to have a large $\Delta L$, it is possible to multiplex/demultiplex light to accomplish wavelength division multiplexing with a narrow wavelength interval, which has not been attained by other type optical multiplexer/demultiplexer of prior art. It is thus possible for the arrayed waveguide grating to have a function of multiplexing/demultiplexing a plurality of signal light beams, specifically a function of demultiplexing or multiplexing a plurality of optical signals with a wavelength interval of 1 nm or less, which is a function deemed necessary for optical wavelength division multiplexing communications of high density.

The above arrayed waveguide grating is an optical waveguide circuit in which an optical waveguide portion 10 having an under cladding, a core and an over cladding formed from silica-based glass or the like is formed on the substrate 11 of silicon or the like. The under cladding is formed on the substrate 11, the core with the above optical waveguide structure is formed thereon, and the over cladding is formed on the core to cover the same. The over cladding is formed from silica-based glass obtained by, for example, doping pure silica with a 6 mol % of $B_2O_3$ and a 6 mol % of $P_2O_5$ ($SiO_2$—$B_2O_3$—$P_2O_5$).

FIGS. 4A to 4D illustrate a process of manufacturing the arrayed waveguide grating, and described below with reference to FIGS. 4A to 4D is a method of manufacturing the optical waveguide circuit. First, as shown in FIG. 4A, a layer for an under cladding 1b is formed on the substrate 11 and a layer for a core 2 is subsequently formed thereon. Next, the layer for the core 2 to form an optical waveguide pattern of the arrayed waveguide grating, thereby forming the core 2 with the optical waveguide structure described above as shown in FIG. 4C, by photolithography reactive ion etching method using a mask 8 as shown in FIG. 4B.

Then a layer for an over cladding 1a is formed on the core 2 so as to cover the core 2 as shown in FIG. 4D. The each layer for the under cladding, the core and the over cladding 1a is formed by flame hydrolysis deposition method and consolidating the glass particles 50 at a temperature of, for example, 1200° C. to 1250° C.

In the optical wavelength division multiplexing communications as above, when only a horizontally polarized wave is transmitted as signal light, a vertically polarized wave perpendicular to the horizontally polarized wave turns into a noise that degrades the transmission characteristic of the above communications. The noise causes reduction in data transmission capacity and transmission distance and, hence, fewer vertically polarized wave is better. On the other hand, when only a vertically polarized wave is transmitted as signal light in the above optical wavelength division multiplexing communications, horizontally polarized wave perpendicular to the vertically polarized wave has to be reduced as much as possible.

In other words, polarization crosstalk (i.e., extinction ratio of signal light to noise light polarized in the direction perpendicular to the polarization of the signal light) has to be as small as possible in the optical wavelength division multiplexing communications system. Specifically, a desirable polarization crosstalk is −20 dB or less in total for the entire optical wavelength division multiplexing communications system. The polarization crosstalk is expressed, for instance, as the following expression (1):

$$\text{Polarization crosstalk} = 10 \log(Py/Px) \quad (1)$$

wherein horizontally polarized wave intensity Px (polarized in the direction x) is the signal light and vertically polarized wave intensity Py (polarized in the direction y) is the noise light.

Accordingly, each of the optical components used in the optical wavelength division multiplexing communications system has to have a polarization crosstalk smaller than −20 dB. However, in a conventional optical waveguide circuit adopted as the light transmissive element of the arrayed waveguide grating, or the like, the horizontally polarized wave and the vertically polarized wave are transmitted together if light entering the circuit has both This makes it difficult to reduce the polarization crosstalk between a polarized wave serving as signal light and a polarized wave perpendicular to the former wave.

SUMMARY OF THE INVENTION

The present invention has been made to solve the problems above, and an object of the present invention is therefore to provide an optical waveguide circuit that has a small polarization crosstalk and is suitable for optical wavelength division multiplexing communications.

In order to attain the above object, the present invention provides an optical waveguide circuit having the following construction. The optical waveguide circuit of the present invention is comprised such that:

an optical waveguide portion is formed on a substrate;

the optical waveguide portion has an under cladding, a core, and an over cladding formed from silica-based glass; and birefringence B in the core is set so as to satisfy $|B| \geq 1.2 \times 10^{-4}$.

In the optical waveguide circuit above, when the thermal expansion coefficient of the over cladding is given as $\alpha g$ and the thermal expansion coefficient of the substrate is given as $\alpha s$, $\alpha g \leq \alpha s - 4.39 \times 10^{-7}$ is satisfied.

According to another aspect of the present invention, an arrayed waveguide grating with the above optical waveguide circuit is provided. The arrayed waveguide grating comprises: one or more optical input waveguides arranged side by side; a first slab waveguide connected to the exit ends of the optical input waveguides; an arrayed waveguide connected to the exit end of the first slab waveguide to transmit light guided by and outputted from the first slab waveguide and composed of a plurality of channel waveguides, the channel waveguides being arranged side by side and having different lengths with the difference preset; a second slab waveguide connected to the exit end of the arrayed waveguide; and a plurality of optical output waveguides arranged side by side and connected to the exit end of the second slab waveguide.

The present inventors have turned their attention to the value of birefringence in the optical waveguide portion that constitutes the optical waveguide circuit and has the under cladding, the core and the over cladding in order to reduce the polarization crosstalk in the optical waveguide circuit of the arrayed waveguide grating or the like. To be specific, in the arrayed waveguide grating, for instance, light condensing positions for a horizontally polarized wave and a vertically polarized wave vary depending on the value of the birefringence. Therefore, the present inventors have thought that a polarized wave serving as noise (a vertically polarized wave when the signal light is a horizontally polarized wave, whereas the noise is a horizontally polarized wave when the signal light is a vertically polarized wave) can be removed by setting the birefringence to a proper value.

Then the inventors have examined for the case of the arrayed waveguide grating the relation between the birefringence in the optical waveguide portion and the polarization crosstalk. As a result of examination, it has been found that, when the arrayed waveguide grating is applied to an optical communications system composed of a polarization maintaining device and a birefringence B is set so as to satisfy $|B| \geq 1.2 \times 10^{-4}$, a polarized wave serving as noise can be removed effectively by the arrayed waveguide grating and the polarization crosstalk can be reduced to −20 dB or less.

According to the present invention, the birefringence B is set to a value that makes it possible to reduce the polarization crosstalk to −20 dB or less ($|B| \geq 1.2 \times 10^{-4}$) based on the results of examination of the relation between the value of the birefringence in the core and the polarization crosstalk. Therefore, the present invention can reduce the polarization crosstalk in the optical waveguide circuit of the arrayed waveguide grating or the like, thereby making the optical waveguide circuit suitable for optical wavelength division multiplexing communications.

Moreover, if $\alpha g \leq \alpha s - 4.39 \times 10^{-7}$ is satisfied when the thermal expansion coefficient of the over cladding is given as $\alpha g$ and the thermal expansion coefficient of the substrate is given as $\alpha s$, the birefringence B can surely be set to the value that makes it possible to reduce the polarization crosstalk to −20 dB or less. The effect above can thus be exerted correctly.

BREIF DESCRIPTION OF THE DRAWINGS

Embodiments of the invention will now be described in conjunction with the drawings in which:

FIGS. 4A to 4D are explanatory diagrams schematically showing a process of manufacturing the optical waveguide circuit.

DETAILED DESCRIPTION OF THE PREFERRED EMBODIMENT

Hereinafter details of the present invention will be described with reference to the drawings illustrating an embodiment of the invention. In describing the embodiment, the parts identical with those of the conventional example are denoted by the same reference symbols, and descriptions thereof will be cut short or omitted. An optical waveguide circuit according to an embodiment of the present invention presents the same appearance as the conventional example, and it has the circuit structure of the conventional example shown in FIG. 1.

Figure 1:
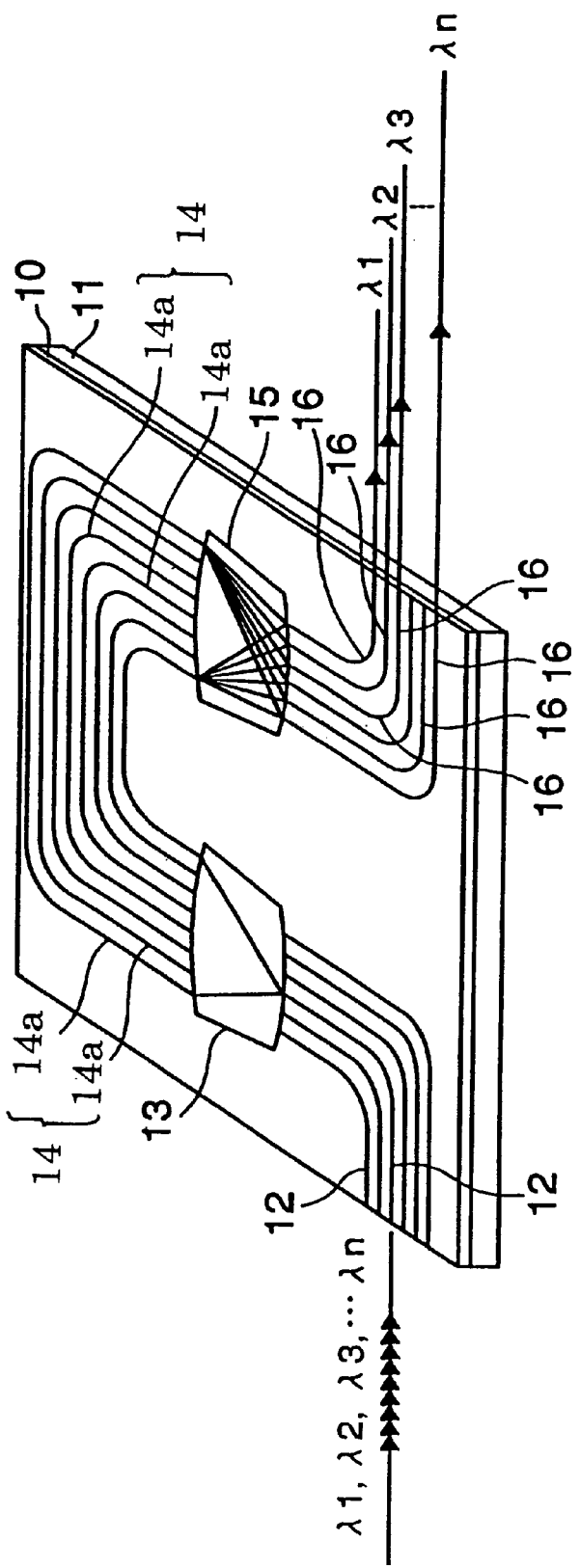
FIG. 1 is a diagram showing an optical waveguide circuit common to the present invention and prior art, as well as its operation of demultiplexing light.

The optical waveguide circuit of this embodiment has a substrate 11 and an optical waveguide portion 10 as shown in FIG. 1, and the waveguide structure of a core 2 of the optical waveguide portion 10 is also the same as the conventional example. An arrayed waveguide grating of this embodiment is characterized by setting of birefringence B in the core 2, specifically, by setting the birefringence B to a value that satisfies $|B| \geq 1.2 \times 10^{-4}$, so that polarization crosstalk can be reduced to make the optical waveguide circuit suitable for optical wavelength division multiplexing communications.

The arrayed waveguide grating of this embodiment functions as a 16 channel optical multiplexer/demultiplexer that demultiplexes an optical input light into wavelength-division-multiplexed lights with an wavelength interval of 100 GHz (about 0.8 nm at 1.55 $\mu$m band) or multiplexes several WDM lights with an wavelength interval of 100 GHz into an optical output. FSR (free spectral range) thereof is 26 nm, the difference in length among adjacent a channel waveguides of an arrayed waveguide 14, $\Delta L$, is 65.3 $\mu$m, and its diffraction order m and specific refractive index difference $\Delta$ are 60 and 0.8%, respectively.

In the arrayed waveguide grating, light condensing positions of a horizontally polarized wave and a vertically polarized wave vary depending upon the value of birefringence in the core 2 of the optical waveguide portion 10 that has an under cladding 1b and an over cladding 1a in addition to the core 2. Therefore, the present inventors have thought that a polarized wave serving as noise (a vertically polarized wave when the signal light is a horizontally polarized wave, whereas the noise component is a horizontally polarized wave when the signal light is a vertically polarized wave) can be removed by setting the birefringence to a proper value and polarization crosstalk in the arrayed waveguide grating can thus be improved.

Employing a manufacturing method illustrated in FIGS. 4A to 4D, the over cladding 1a is formed from silica glass doped with a 3.6 to 7 mol % of $B_2O_3$ and a 3.6 to 7 mol % of $P_2O_5$ ($SiO_2$—$B_2O_3$—$P_2O_5$) as shown in Table 1. Note that doses of $B_2O_3$ and $P_2O_5$ are different for different arrayed waveguide gratings. As a result, four arrayed waveguide gratings having different birefringence B are manufactured as representative examples of the optical waveguide circuit. These sample arrayed waveguide gratings each have the waveguide structure of FIG. 1.

TABLE 1

|  | Experiment condition 1 | Experiment condition 2 | Experiment condition 3 | Experiment condition 4 |
| --- | --- | --- | --- | --- |
| $B_2O_3$ mol% | 7 | 5.8 | 5.2 | 3.6 |
| $P_2O_5$ mol% | 7 | 5.8 | 5.2 | 3.6 |
| Birefringence $|B|$ | $0.7 \times 10^{-4}$ | $1.6 \times 10^{-4}$ | $2.2 \times 10^{-4}$ | $3.5 \times 10^{-4}$ |

The birefringence values B in Table 1 are calculated as follows. First, the thermal expansion coefficient of the over cladding 1a is obtained for each of the four sample arrayed waveguide gratings by the calculation below.

An internal stress 6 generated in the optical waveguide circuit is expressed as the following expression (2) when the bend radius of the optical waveguide circuit with respect to the substrate plane is given as R.

$$\sigma = \{E_s b^2\}/\{6(1-\gamma_s) R \cdot d\} \quad (2)$$

In the expression (2), $E_s$ is Young's modulus of the substrate 11 (a silicon substrate, in this embodiment), and its value in this embodiment is $1.3 \times 10^{11}$ (Pa). The thickness of the substrate 11 is represented by b, which is in this embodiment $1.0 \times 10^{-3}$ (m). $\gamma_s$ is Poisson's ratio of the substrate 11 and is 0.28 in this embodiment. Represented by d is the thickness of the over cladding 1a (the distance between the top of the under cladding 1b and the top of the over cladding 1a), which is $0.03 \times 10^{-3}$ (m) in this embodiment.

Heat stress $\sigma_T$ applied to the optical waveguide circuit is expressed as the following expression (3).

$$\sigma_T = E_g(\alpha g - \alpha s)\Delta T \quad (3)$$

In the expression (3), $E_g$ is Young's modulus of the over cladding 1a. When approximated with the value of pure quartz, $E_g$ is $7.29 \times 10^{10}$ (Pa). $\alpha g$ and $\alpha s$ represent the thermal expansion coefficient of the over cladding 1a and the thermal expansion coefficient of the substrate 11, respectively. $\Delta T$ is the temperature difference between a temperature at which the silica-based glass used to form the over cladding 1a is consolidating and a room temperature.

Here, if all of the internal stress is presented as heat stress, $\sigma = \sigma_T$ is established. Therefore the following expression (4) is obtained from the expressions (2) and (3).

$$\alpha g = \alpha s + [\{E_s b^2\}/\{6 E_g (1-\gamma_s) d \cdot R \cdot \Delta T\}] \quad (4)$$

Then the degree of camber of the optical waveguide circuits manufactured as above is measured by using a surface shape measuring device of direct contact type. The measured degree of camber is substituted in the expression (4) to obtain the actual value of the thermal expansion coefficient of the over cladding 1a. The thermal expansion coefficient of silicon is used here for the thermal expansion coefficient of the substrate 11, and $\alpha s = 3.0 \times 10^{-6}$ $C.^{-1}$.

For instance, in the case of the arrayed waveguide grating manufactured in accordance with Experiment Condition 2, the bend radius R is 23.5 m and the thermal expansion coefficient $\alpha g$ of the over cladding 1a calculated from the expression (4) is $2.41 \times 10^{-6}$ $C.^{-1}$. The arrayed waveguide grating here, when the grating forms on the substrate 11, projects upward (i.e., concaved on the substrate 11 side).

The birefringence B is expressed as the following expression (5). The obtained thermal expansion coefficient $\alpha g$ of the over cladding 1*a* is substituted in the expression (5) to obtain the birefringence B.

$$B=(C_2-C_1)E_g(\alpha g-\alpha s)\Delta T \qquad (5)$$

In the expression (5), $C_1$ is the photoelasticity constant of the over cladding 1*a* parallel to the substrate 11. $C_2$ represents the photoelasticity constant of the over cladding 1*a* perpendicular to the substrate 11. $E_g$ is Young's modulus of the over cladding 1*a*. $\alpha g$, $\alpha s$ and $\Delta T$ represent the same as those in the expression (3) and have the same values as the expression (3).

The photoelasticity of silica glass parallel to the substrate 11, $-0.65\times10^{-2}$ ($Pa^{-1}$), is substituted for $C_1$ in the expression (5). $C_2$ is substituted by the photoelasticity of silica glass perpendicular to the substrate 11: $-4.22\times10^{-12}$ ($Pa^{-1}$). The Young's modulus of quartz, $7.29\times10^{10}$ (Pa) is substituted for $E_g$. $\Delta T$ is substituted by a value obtained from a temperature of sintering the over cladding 1*a*: $-1000°$ C. Further, the thermal expansion coefficient $\alpha g$ of the over cladding according to Experiment Condition 2, $2.41\times10^{-6}$, is substituted in the expression (5) to obtain the birefringence B. As a result, B in the case of the Experiment Condition 2 is $1.6\times10^{-4}$.

Figure 3:
FIG. 3 is an explanatory diagram illustrating an example of a polarization crosstalk measuring system adopted to obtain the relation between birefringence and polarization crosstalk in FIG. 2.
Figure 3:
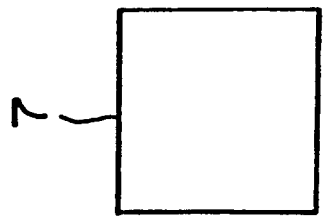
Figure 3:
Figure 3:
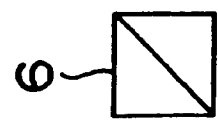
Figure 3:
Figure 3:
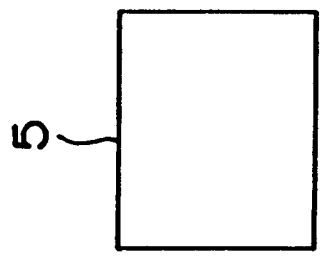
Figure 3:
Figure 3:
Figure 3:
Figure 3:
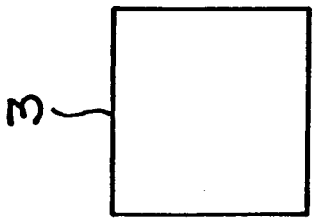

Polarization crosstalk is measured for each of the sample arrayed waveguide gratings by using a polarization crosstalk measuring system structured as shown in FIG. 3. In FIG. 3, the arrayed waveguide grating is denoted by reference symbol 5. The measuring system has, from left to right in the drawing, a light source 3, a lens 21, a polarizer 4, a lens 22, the arrayed waveguide grating 5, a lens 23, an analyzer 6, a lens 24, and an optical power meter 7 arranged in this order.

When polarization crosstalk is measured using this measuring system, a direction x in FIG. 3 is first aligned with the horizontally polarized wave direction of the arrayed waveguide grating 5. A component polarized in the direction x is thus set as the signal light and a component polarized in a direction y is set as noise light. Then light emitted from the light source 3 is entered to the polarizer 4 through the lens 21. The polarization of the light is changed by the polarizer 4, producing a linear polarized wave that forms an angle of 0, 5, 10, 20, 30 or 45 degree of orientation with respect to the x axis. The linear polarized wave is entered into the arrayed waveguide 5 through the lens 22.

The light after leaving the arrayed waveguide grating 5 is entered to the analyzer 6 through the lens 23. The light is emitted from the analyzer 6 while rotating the analyzer 6, and it passes through the lens 24 to be detected by the optical power meter 7. The maximum value (in this case, corresponds to an intensity Px in the horizontal direction (the direction x)) and the minimum value (in this case, corresponds to an intensity Py in the vertical direction (the direction y)) of the detected light are measured and used to obtain polarization crosstalk by the expression (1).

Figure 2:
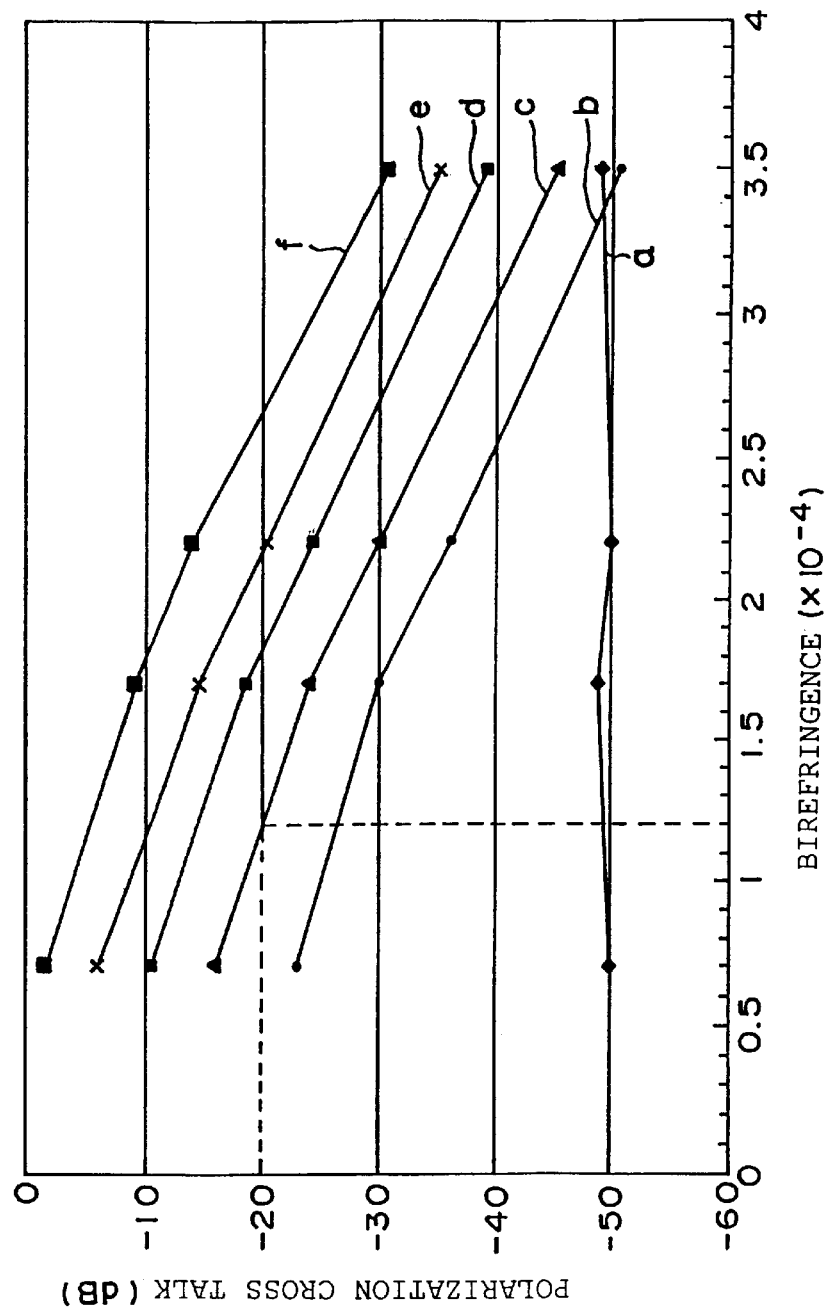
FIG. 2 is a graph showing the results of obtaining the relation between birefringence in the optical waveguide portion and polarization crosstalk when linear polarized wave is entered to the optical waveguide circuit, with the orientation angle of the linear polarized wave varied.

The results are shown in FIG. 2. In FIG. 2, a characteristic line a indicates the relation between the birefringence and polarization crosstalk when the angle of the linear polarized incident wave of the arrayed waveguide grating with respect to the x axis is 0 degree. Similarly, characteristic lines b, c, d, e and f indicate the relation when the angle is 5 degree, 10 degree, 20 degree, 30 degree, and 45 degree, respectively. When the angle of the linear polarized incident wave of the arrayed waveguide grating with respect to the x axis is 45 degree, optical power ratio of the wave polarized in the direction x to that of the wave polarized in the direction y is 1:1.

As is apparent from FIG. 2, polarization crosstalk becomes smaller as the birefringence value is increased. When the angle of the linear polarized wave with respect to the x axis is 0 degree, polarization crosstalk is small regardless of the birefringence value. This is because polarization crosstalk becomes smaller as the angle of the linear polarized wave with respect to the x axis is decreased and because there is no noise component when the orientation angle is 0 degree.

The arrayed waveguide grating of this embodiment is applied to an optical communications system for transmitting light while keeping the polarization of the light. An optical device adopted in such an optical communications system is composed of polarization maintaining devices.

Accordingly, optical output from each optical device (polarization maintaining device) constituting the optical communications system of this type has not so a large polarized wave component that serves as a noise component (a vertically polarized wave when the signal light is a horizontally polarized wave, whereas the noise component is a horizontally polarized wave when the signal light is a vertically polarized wave). It is thus supposed that, if the arrayed waveguide grating of this embodiment is applied to the above optical communications system, the total of the noise components of the polarization maintaining devices (degradation of polarized extinction due to connection between devices) that are provided on the entrance side of the arrayed waveguide grating does not generally exceed 10 degree when expressed as the orientation angle.

Then, on the basis of the results shown in FIG. 2, an examination has been made on the relation between the birefringence and polarization crosstalk in the case where the orientation angle is 10 degree or less while taking into consideration a general noise component of a polarized wave entered into the arrayed waveguide grating. The examination has revealed that polarization crosstalk can be reduced to $-20$ dB or less when the birefringence value B satisfies $|B|\geq1.2\times10^{-4}$. In short, if the absolute value of the birefringence in the arrayed waveguide grating is set to $1.2\times10^{-4}$ or more when the orientation angle is 10 degree or less, the arrayed waveguide can effectively remove a polarized wave that serves as the noise.

In order to set the birefringence to a value that satisfies $|B|\geq1.2\times10^{-4}$, the thermal expansion coefficient $\alpha g$ of the over cladding 1*a* is set so as to satisfy $\alpha g \leq 2.56\times10^{-6°}$ $C.^{-1}$ when the substrate 11 is a silicon substrate as in the above.

As can be understood from the expression (5), the birefringence value is determined by the photoelasticity constant $C_1$ of the over cladding 1*a* parallel to the substrate 11, the photoelasticity constant $C_2$ of the over cladding 1*a* perpendicular to the substrate 11, Young's modulus $E_g$ of the over cladding 1*a*, the thermal expansion coefficient $\alpha g$ of the over cladding 1*a*, and the thermal expansion coefficient $\alpha s$ of the substrate 11. If the thermal expansion coefficient $\alpha g$ of the over cladding 1*a* is generalized by the thermal expansion coefficient $\alpha s$ of the substrate 11 using the expression (5), $\alpha g \leq \alpha s - 4.39\times10^{-7}$ is obtained. Therefore $\alpha g$ has to satisfy this expression when the substrate 11 is other than the silicon substrate and, for instance, a sapphire substrate.

The above examination has been made with a wave polarized in the direction x as the signal light and with a wave polarized in the direction y as the noise light. However, the same result is obtained in the case where the signal light is a wave polarized in the direction y and the noise light is a wave polarized in the direction x. When an optical waveguide circuit such as these arrayed waveguide gratings is applied to the optical communications system, a polarized wave having a larger intensity among light beams outputted from the optical waveguide circuit is regarded as the signal light and this polarized wave light is transmitted, whereas a polarized wave component perpendicular to the transmitted polarized wave is regarded as the noise light.

In this embodiment, the birefringence B in the optical waveguide portion 10 of the arrayed waveguide grating is set so as to satisfy $|B| \geq 1.2 \times 10^{-4}$ on the basis of the above examination. Therefore, polarization crosstalk can be reduced to an appropriate value, e.g., −20 dB or less, making the optical waveguide circuit suitable for optical wavelength division multiplexing communications. By applying this embodiment to an optical wavelength division multiplexing communications system, it is possible to accurately remove the noise component on the entrance side of the optical waveguide circuit according to this embodiment.

An optical wavelength division multiplexing communications system has been proposed in proceeding (K.Imai, et al. in Proc. Communications Society Conference of IEICE, B-10-87, 1999). In this system, a first arrayed waveguide grating multiplexes wavelengths of odd channels, a second arrayed waveguide grating multiplexes wavelengths of even channels, and the light multiplexed by the first arrayed waveguide grating and the light multiplexed by the second arrayed waveguide grating are multiplexed such that their polarized directions are perpendicular to each other. If this embodiment is applied to the optical wavelength division multiplexing communications system as such, for example, optical transmission through the proposed system can be conducted securely by, e.g., multiplexing a wave polarized in the direction x as the signal light in the first arrayed waveguide grating and by multiplexing a wave polarized in the direction y as the signal light in the second arrayed waveguide grating.

Note that the present invention is not limited to the above embodiment but may take various modes for carrying out the invention. For instance, the optical waveguide circuit, which is an arrayed waveguide grating in the above embodiment, does not necessarily be the arrayed waveguide grating. It may be various kinds of optical waveguide circuit as long as it has a substrate and an optical waveguide portion formed thereon and including an under cladding, a core and an over cladding which are formed from silica glass.

What is claimed is:

1. An optical waveguide circuit comprising:

an optical waveguide portion is formed on a substrate;

the optical waveguide portion has an under cladding, a core, and an over cladding formed from silica-based glass; and birefringence B in the core is set so as to satisfy $|B| \geq 1.2 \times 10^{-4}$, wherein, when the thermal expansion coefficient of the over cladding is given as $\alpha g$ and the thermal expansion coefficient of the substrate is given as $\alpha s$, $\alpha g \leq \alpha s - 4.39 \times 10^{-7}$ is satisfied.

2. An arrayed waveguide grating with an optical waveguide circuit according to claim 1, the arrayed waveguide grating comprising:

one or more optical input waveguides arranged side by side;

a first slab waveguide connected to the exit ends of the optical input waveguides;

the arrayed waveguide connected to the exit end of said first slab waveguide to transmit light guided by and outputted from the first slab waveguide and composed of a plurality of channel waveguides, said channel waveguides being arranged side by side and having different lengths with the difference preset;

a second slab waveguide connected to the exit end of the arrayed waveguide; and a plurality of optical output waveguides arranged side by side and connected to the exit end of the second slab waveguide.

* * * * *